(12) United States Patent
Motter et al.

(10) Patent No.: US 7,513,100 B2
(45) Date of Patent: Apr. 7, 2009

(54) SYSTEMS FOR LOW EMISSION GAS TURBINE ENERGY GENERATION

(75) Inventors: Eric Motter, Greenville, SC (US); Willy Steve Ziminsky, Simpsonville, SC (US); Arthur James Fossum, Greer, SC (US); Robert Joseph Iasillo, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 581 days.

(21) Appl. No.: 11/257,204

(22) Filed: Oct. 24, 2005

(65) Prior Publication Data

US 2007/0089425 A1    Apr. 26, 2007

(51) Int. Cl.
   *F02C 3/30* (2006.01)
(52) U.S. Cl. .................. 60/39.3; 60/39.55
(58) Field of Classification Search ............ 60/39.3, 60/39.5, 39.53, 39.55, 39.59
   See application file for complete search history.

(56) References Cited

U.S. PATENT DOCUMENTS

| | | | |
|---|---|---|---|
| 4,667,465 A * | 5/1987 | Munk | 60/39.3 |
| 5,987,875 A * | 11/1999 | Hilburn et al. | 60/39.55 |
| 6,495,108 B1 | 12/2002 | Rising | |
| 6,595,003 B2 * | 7/2003 | Dalla Betta et al. | 60/39.55 |
| 2003/0015413 A1 | 1/2003 | Rising | |
| 2005/0000220 A1 | 1/2005 | Zauderer | |

* cited by examiner

Primary Examiner—Louis J Casaregola
(74) Attorney, Agent, or Firm—Armstrong Teasdale LLP

(57) ABSTRACT

Methods and systems for a dry low $NO_x$ gas turbine engine system include a gas turbine engine including at least one dry low $NO_x$ combustor. The combustor includes a plurality of injection points wherein at least some of the injection points are configured to inject a fuel into the combustor at a plurality of different locations. The system includes a water source coupled to the combustor and operable to inject water into others of the plurality of injection points. The system also includes a control system that includes a sensor configured to measure an exhaust gas concentration of the turbine, a processor programmed to receive a signal indicative of the turbine exhaust gas concentration, and to automatically control the water injection using the received exhaust gas concentration signal. Such systems in use together can mitigate visible emissions from the exhaust stack.

14 Claims, 5 Drawing Sheets

SYSTEMS FOR LOW EMISSION GAS TURBINE ENERGY GENERATION

BACKGROUND OF THE INVENTION

This invention relates generally to power generation involving the combustion of gas fossil fuels, and more particularly to methods and apparatus for reducing visible emissions in heavy-duty gas turbine power generators.

The condition of a visible yellow plume emanating from the stacks of combined cycle power plants is typically caused by an $NO_2$ concentration exiting the gas turbine engine. As gas turbines have became more sophisticated, exhaust temperatures have increased. The $NO_2$ level exiting the stack comes generally from two sources, $NO_2$ formed in the combustion system and conversion of NO to $NO_2$ in the exhaust path. A higher exhaust temperature increases the amount of NO to $NO_2$ conversion in the exhaust path. Water injection has been shown to facilitate lowering the amount of $NO_x$ produced in a combustion system. Typically, water is used in non-Dry Low $NO_x$ combustors to reduce $NO_x$ over a contractual guarantee range (usually 50%-100% load). In comparison, existing Dry Low $NO_x$ combustion systems utilize a diffusion stabilized, partially premixed flame without water injection from 0% to 50% load. Typically, the design requirements for a dry low $NO_x$ (DLN) combustion system operating at part load are to maintain a stable flame with robust operability and durability. To mitigate visible exhaust emissions, additional parameters are needed to be added to such list of design requirements. A diffusion stabilized partially premixed DLN combustion flame is not capable of meeting all of these design requirements.

During a cold start of a gas turbine engine, at least some known gas turbine engines are operated for approximately four hours or more at partial loading (0 to 50%) prior to reaching full pre-mixed operation (50 to 100% load). During this partial loading operation, the level of $NO_2$ exiting the exhaust stack can be sufficient to cause a visible plume. It has been found that the concentration of $NO_2$ exiting the stack can be up to three times the concentration of $NO_2$ exiting the gas turbine, while the overall $NO_x$ level remained substantially constant. The relationship, $NO_x=NO+NO_2$ suggests that conversion of NO to $NO_2$ occurs between the gas turbine exit and the top of the exhaust stack. The amount of $NO_2$ exiting the exhaust stack, which can appear as a yellow plume, does not violate any environmental regulations, however, it is perceived as unsightly and can lead to a poor public perception of the power plant.

BRIEF DESCRIPTION OF THE INVENTION

In one embodiment, a dry low $NO_x$ gas turbine engine system includes a gas turbine engine including at least one dry low $NO_x$ combustor. The combustor includes a plurality of injection points wherein at least some of the injection points are configured to inject a fuel into the combustor at a plurality of different locations. The system includes a water source coupled to the combustor and operable to inject water into others of the plurality of injection points. The system also includes a control system that includes a sensor configured to measure an exhaust gas concentration of the turbine, a processor programmed to receive a signal indicative of the turbine exhaust gas concentration, and to automatically control the water injection using the received exhaust gas concentration signal.

In another embodiment, a low-emission method for producing power using a gas turbine engine includes premixing a plurality of fuel and air mixtures, injecting the fuel and air mixtures into a combustion chamber using a plurality of fuel nozzles, injecting a quantity of water into the combustion chamber using the fuel nozzles during a relatively low power production stage of operation, and automatically controlling a ratio of fuel and air, and water injected by at least one of the fuel nozzles to control a concentration of $NO_x$ emissions exiting the gas turbine engine.

In yet another embodiment, a combined cycle power plant system includes a dry low $NO_x$ gas turbine engine system including at least one dry low $NO_x$ combustor including a plurality of injection points wherein at least some of the injection points are configured to inject a fuel into the combustor at a plurality of different locations. The system includes a water source coupled to the combustor and operable to inject water into others of the plurality of injection points, and a control system including a sensor configured to measure an exhaust gas concentration. The system also includes a processor programmed to receive a signal indicative of the exhaust gas concentration, and automatically control the water injection using the received exhaust gas concentration signal.

DETAILED DESCRIPTION OF THE INVENTION

While the methods and apparatus are herein described in the context of a gas turbine engine used in an industrial environment, it is contemplated that the method and apparatus described herein may find utility in other combustion turbine systems applications including, but not limited to, turbines installed in aircraft. In addition, the principles and teachings set forth herein are applicable to gas turbine engines using a variety of combustible fuels such as, but not limited to, natural gas, gasoline, kerosene, diesel fuel, and jet fuel. The description hereinbelow is therefore set forth only by way of illustration, rather than limitation.

Figure 1:
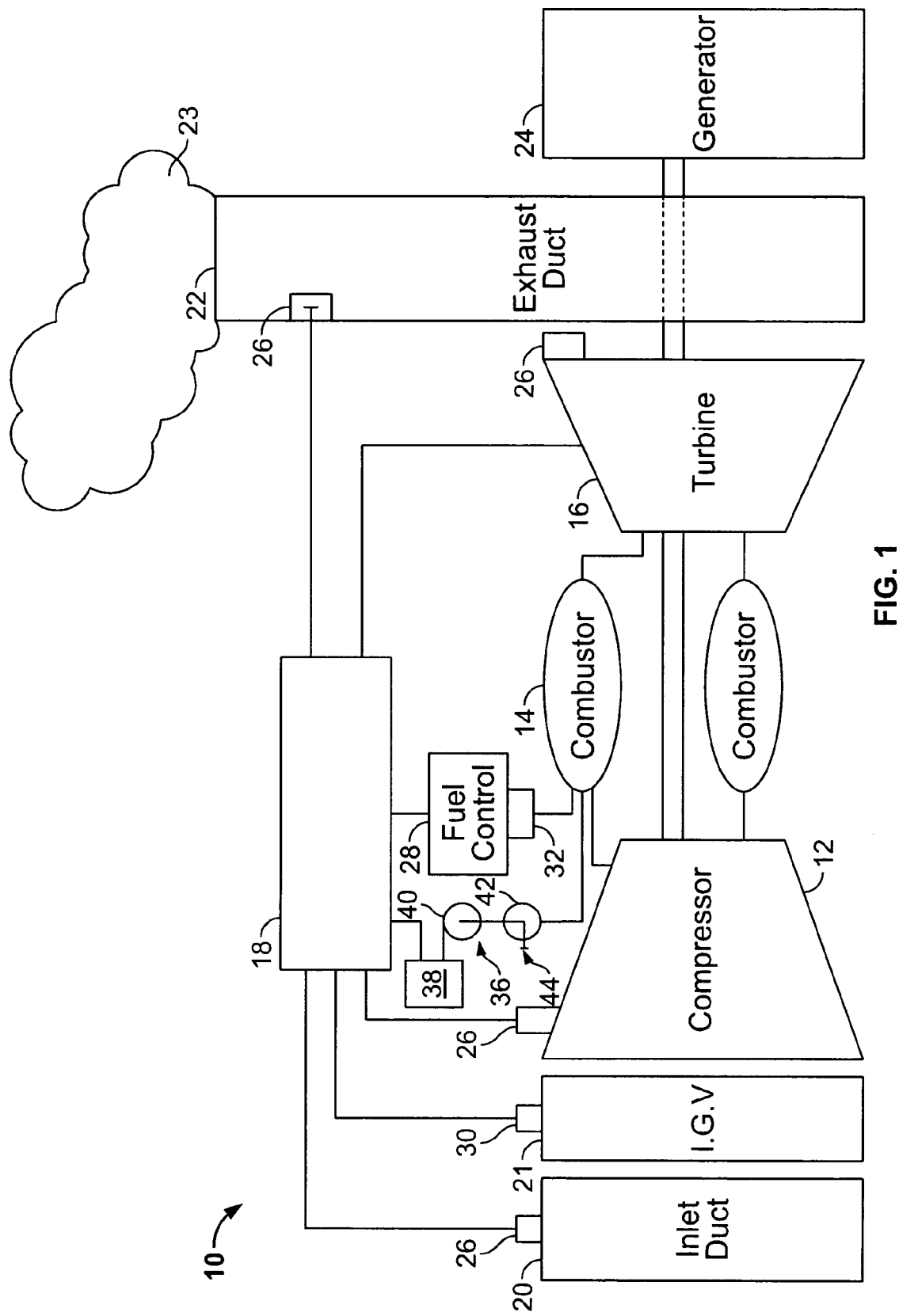
FIG. 1 is a schematic diagram of a gas turbine engine system.

FIG. 1 is a schematic diagram of a gas turbine engine system 10 including a compressor 12, a combustor 14, a turbine 16 drivingly coupled to compressor 12, and a control system 18. An inlet duct 20 channels ambient air to the compressor. Inlet duct 20 may have ducts, filters, screens and sound absorbing devices that contribute to a pressure loss of ambient air flowing through inlet duct 20 into one or more inlet guide vanes 21 of compressor 12. An exhaust duct 22 channels combustion gases 23 from an outlet of turbine 16 through, for example, emission control, and sound absorbing devices. Exhaust duct 22 may include sound adsorbing materials and emission control devices. Turbine 16 drives a generator 24 that produces electrical power.

The operation of the gas turbine engine system 10 is typically monitored by several sensors 26 used to detect various conditions of turbine 12, generator 24, and the ambient environment. For example, temperature sensors 26 may monitor ambient temperature surrounding gas turbine engine system 10, compressor discharge temperature, turbine exhaust gas temperature, and other temperature measurements of the gas stream through the gas turbine engine. Pressure sensors 26 may monitor ambient pressure, and static and dynamic pressure levels at the compressor inlet and outlet, turbine exhaust, at other locations in the gas stream through the gas turbine. Humidity sensors 26, such as wet and dry bulb thermometers measure ambient humidity in the inlet duct of the compressor. Sensors 26 may also comprise flow sensors, speed sensors, flame detector sensors, valve position sensors, guide vane angle sensors, and other sensors that sense various parameters relative to the operation of gas turbine engine system 10. As used herein, "parameters" refer to physical properties whose values can be used to define the operating conditions of gas turbine engine system 10, such as temperatures, pressures, and gas flows at defined locations.

A fuel control system 28 regulates the fuel flowing from a fuel supply to combustor 14, and the split between the fuel flowing into various fuel nozzles located about the combustion chamber. Fuel control system 28 may also select the type of fuel for the combustor. The fuel control system 28 may be a separate unit or may be a component of control system 18. Fuel control system 28 may also generate and implement fuel split commands that determine the portion of fuel flowing to primary fuel nozzles and the portion of fuel flowing to secondary fuel nozzles.

Control system 18 may be a controller having a processor(s) that executes programs to control the operation of the gas turbine using sensor inputs and instructions from human operators. The programs executed by controller 18 may include scheduling algorithms for regulating fuel flow to combustor 14. The commands generated by controller 18 cause actuators on the gas turbine to, for example, adjust valves (actuator 32) between the fuel supply and combustors that regulate the flow, fuel splits and type of fuel flowing to the combustors; adjust inlet guide vanes 21 (actuator 30) on the compressor, and activate other control settings on the gas turbine.

A water injection system 36 is also controllable by controller 18 through a variable frequency drive (VFD) 38 coupled to a motor 40 of a water injection pump 42. Pump 42 receives water from a source 44 and is modulated to supply a quantity of water to combustor 14.

Controller 18 regulates the gas turbine based, in part, on algorithms stored in a computer memory of controller 18. These algorithms enable controller 18 to maintain the $NO_x$ and CO and other emissions in the turbine exhaust to within certain predefined emission limits. The algorithms have inputs for parameter variables for current compressor pressure ratio, ambient specific humidity, inlet pressure loss and turbine exhaust backpressure. Because of the parameters in inputs used by the algorithms, controller 18 accommodates seasonal variations in ambient temperature and humidity, and changes in the inlet pressure loss through the inlet 20 of the gas turbine and in the exhaust backpressure at the exhaust duct 22. Input parameters for ambient conditions, and inlet pressure loss and exhaust back pressure enable $NO_x$, CO and turbine firing algorithms executing in controller 18 to automatically compensate for seasonal variations in gas turbine operation and changes in inlet loss and in back pressure. Accordingly, the need is reduced for an operator to manually adjust a gas turbine to account for seasonal variations in ambient conditions and for changes in the inlet pressure loss or turbine exhaust backpressure.

In the exemplary embodiment, combustor 14 is a DLN combustion system. Controller 18 may be programmed and modified to control the DLN combustion system and for determining fuel splits.

The schedules and algorithms executed by controller 18 accommodate variations in ambient conditions (temperature, humidity, inlet pressure loss, and exhaust backpressure) that affect NOx, combustor dynamics, and firing temperature limits at part-load gas turbine operating conditions. Controller 18 simultaneously schedules exhaust temperature and combustor fuel splits. Controller 18 applies algorithms for scheduling the gas turbine, such as setting desired turbine exhaust temperatures and combustor fuel splits, to satisfy performance objectives while complying with operability boundaries of the gas turbine. Controller 18 simultaneously determines level combustor temperature rise and NOx during part-load operation in order to increase the operating margin to the combustion dynamics boundary and thereby improve operability, reliability, and availability of the gas turbine.

The combustor fuel splits are scheduled by controller 18 to maintain the desired combustion mode while observing other operability boundaries, such as combustion dynamics. At a given load level, the cycle match point and the combustor fuel splits influence the resultant NOx emissions. Simultaneously leveling NOx and combustor temperature rise during part-load operation minimizes the level of combustion dynamics and expands the operational envelope of the gas turbine without adversely affecting emissions compliance or parts life.

Combustors 14 include a plurality of fuel control valves supplying two or more injector groups in each combustor to allow modulation of modes of operation, emissions, and combustion dynamics levels versus machine load. By modulating fuel splits among the several fuel gas control valves, emissions and dynamics are optimized over the machine load range. Fuel split modulation depends on a calculated reference parameter, called combustion reference temperature, which is a function of machine exhaust temperature and other continuously monitored machine parameters.

Figure 2:
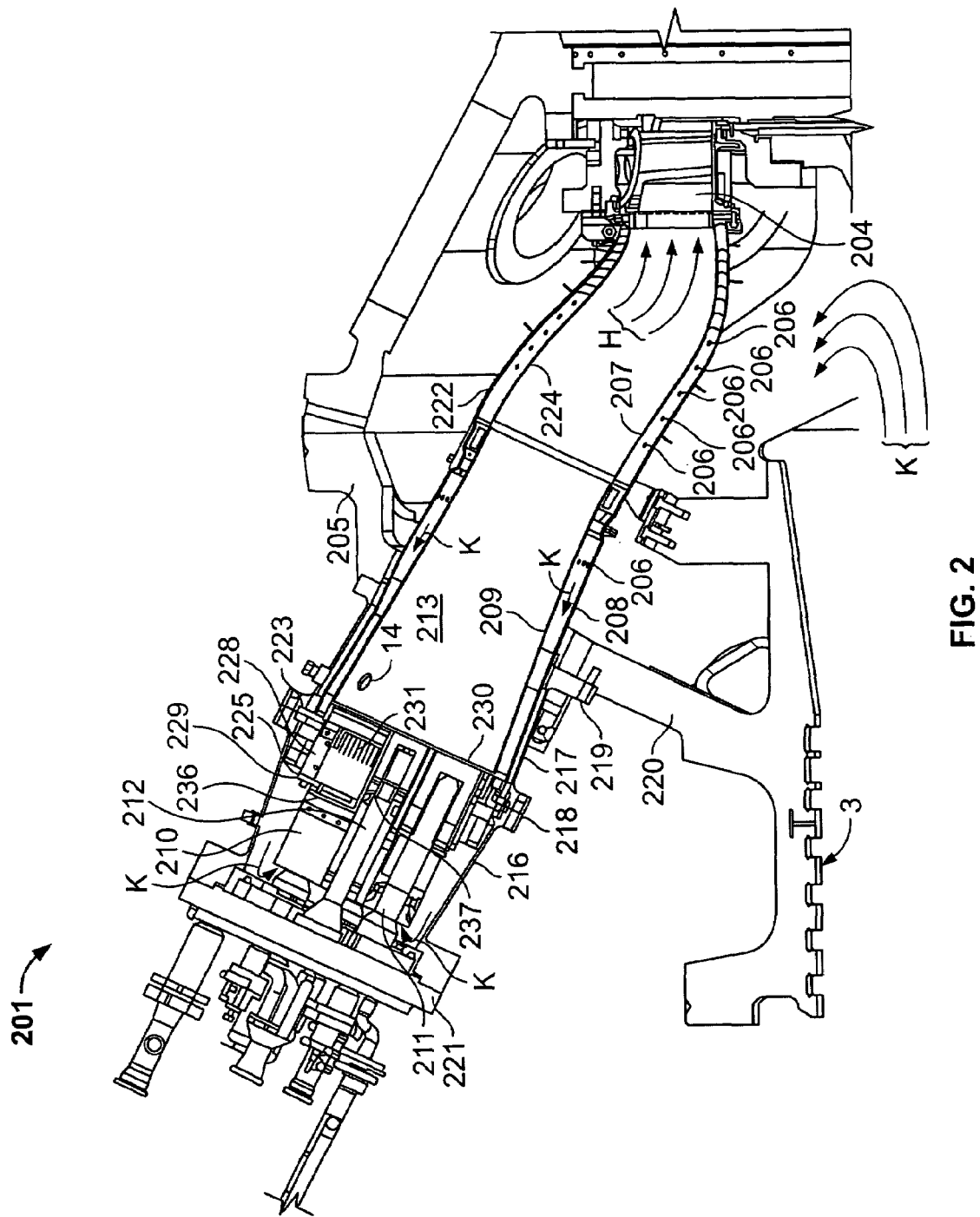
FIG. 2 is a partial cross section of a low NOx gas turbine combustion system such as those shown in FIG. 1.

FIG. 2 is a partial cross section of one low NOx gas turbine combustor 14 such as those shown in FIG. 1. Gas turbine engine system 10 includes a plurality of combustors 14 arranged in an annular array about the periphery of a gas turbine casing 205. High pressure air K from compressor 12 flows into combustors 14 through an array of air inlet holes 206 distributed among a transition piece 207 and a flow sleeve 208 near an outlet end of combustor liner 209. Compressed air delivered to combustor 14 flows through an annular passage bounded by combustor flow sleeve 208 and combustor liner 209 to a combustor inlet end (or synonymously, head end) 210 where there are arranged a plurality of air-fuel injectors of at least two different types. For example, in some configurations, the plurality of air-fuel injectors comprise an array of outer fuel nozzles 211 and a center nozzle 212 per combustor 14. Not all configurations have the same number of inner nozzles or the same number of outer nozzles as that described herein. By way of example only, some configurations include more than one center nozzle 212 surrounded by a different number of outer nozzles 211 than that described herein.

At an inlet end of each combustor 14, compressed air and fuel are mixed and flow into a combustion burning zone 213. At the opposite end of combustion burning zone 213, hot combustion gases H flow into double-walled transition piece 207 that couples an outlet end of each combustor liner 209 with an inlet end of turbine nozzle 204 to deliver hot combustion gas flow H to turbine 16, where the enthalpy of the hot gas flow is converted to shaft work in the turbine rotor via the expansion of gas flowing through stationary and rotating turbine airfoils (not shown in the Figures).

Each combustor 14 includes a substantially cylindrical combustion casing assembly comprising two sections, namely, a forward combustion casing 216 and an aft combustion casing 217. Combustion casings 216 and 217 are attached to compressor discharge casing 220 by a bolted joint 219. Forward combustion casing 216 is connected to aft combustion casing 217 by bolted joint 218. The head end of forward combustion casing 216 is closed by an end cover assembly 221 that may also include fuel and air supply tubes, manifolds and associated valves for feeding gas, liquid fuel, air, and water (if desired) to combustor 14 as described in greater detail below. In some configurations of the present invention, end cover assembly 221 is configured as a mounting base to receive a plurality (for example, five) outer fuel nozzle assemblies 211 arranged in an annular array about a longitudinal axis of combustor 14.

A substantially cylindrical flow sleeve 208 is concentrically mounted in combustion casings 216 and 217. Flow sleeve 208 connects at its aft end to an outer wall 222 of double walled transition piece 207. Compressor air K flows through an outer passage of double walled transition piece 207, over and through flow sleeve 208, and to the combustor 14 head end 210. Flow sleeve 208 is coupled at its forward end by means of a radial flange 223 to aft combustor casing 217 at bolted joint 218 where forward combustion casing 216 and aft combustion casing 217 are joined.

In the exemplary embodiment, flow sleeve 208 is concentrically arranged with a combustor liner 209 that is connected at one end with an inner wall 224 of transition piece 207. The opposite (forward or head) end of the combustor liner 209 is supported by a combustion liner cap assembly 225 which is, in turn, supported within the combustor casing by a plurality of struts (not shown) and an associated mounting flange assembly (not shown). Outer wall 222 of transition piece 207, as well as a portion of flow sleeve 208 extending aft of the location at which aft combustion casing 217 is bolted to compressor discharge casing 220, are formed with an array of apertures or inlet holes 206 over their respective peripheral surfaces to permit air to reverse flow from compressor 12 through apertures 206 into the annular space between flow sleeve 208 and combustor liner 209 toward the upstream or head end 210 of combustor 14 (as indicated by the flow arrows K).

Combustion liner cap assembly 225 supports a plurality of pre-mix tube assemblies 228, one mounted concentrically about each fuel nozzle assembly 211 and 212. Each pre-mix tube assembly 228 is supported within combustion liner cap assembly 225 at its forward and aft ends by a forward plate 229 and aft plate 230, respectively, each provided with openings aligned with the open-ended pre-mix tube assemblies 228. Each pre-mix tube assembly 228 comprises an assembly of two tubes separated by a pre-mix tube hula seal 231, which permits the dual-tube assembly to change in length as combustion liner cap assembly 225 expands thermally from cold non-running conditions to hot operating conditions. In other words, as the distance between forward support plate 229 and aft support plate 230 changes due to thermal expansion of the overall assembly, the pre-mix tube assemblies 228 are free to expand accordingly along an axis of symmetry.

Aft plate 230 of combustion liner cap assembly 225 mounts to a plurality of forwardly extending floating collars 236 (one for each pre-mix tube assembly 228, arranged in substantial alignment with the openings in aft plate 230), each of which supports an air swirler 237 (also referred to herein as a "swirling vane") which is, for example, integrally formed in fuel nozzles 211 and 212 (also referred to herein as "fuel injection nozzles," "fuel injectors," or "fuel nozzle assemblies"). The arrangement is such that air flowing in the annular space between combustor liner 209 and flow sleeve 208 is forced to reverse direction at combustor inlet end 210 of combustor 14 (between end cover assembly 221 and combustion liner cap assembly 225) and to flow through air swirlers 237 and pre-mix tube assemblies 228. Fuel passages integrally manufactured into each of air swirlers 237 deliver fuel through an arrangement of apertures that continuously introduce gas fuel, depending upon the operational mode of gas turbine engine assembly 10 into the passing air, thereby creating a fuel and air mixture that is subsequently and continuously ignited in combustion burning zone 213.

Figure 3:
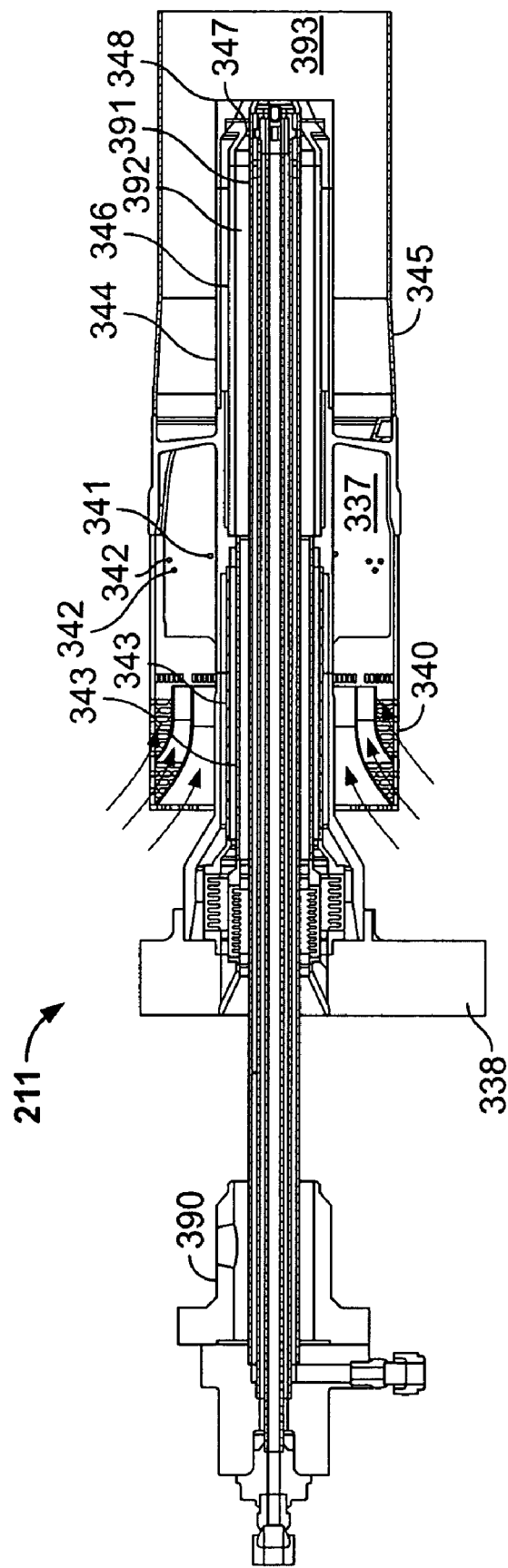
FIG. 3 is a cross-sectional view of an exemplary fuel injection nozzle that may be used with the low NOx gas turbine combustion system shown in FIG. 2.

FIG. 3 is a cross-sectional view of an exemplary fuel injection nozzle 211 shown in FIG. 2. Each fuel injector nozzle 211 includes a flange assembly 338 that attaches by a sealed and bolted joint assembly to the inside of end cover assembly 221 (shown in FIG. 2). Fluids including, but not necessarily limited to gas fuel and purge air, are supplied to passages of gas fuel injection nozzle 211. These fluids are supplied through flange assembly 238, having previously passed through piping manifold assemblies (not shown). End cover assembly 221 is thus supplied with fuels and other working fluids that are delivered via fuel nozzle 211 in a precise fashion into combustion burning zone 213 (shown in FIG. 2). A liquid fuel and water injection cartridge 390 attaches to the outside of end cover assembly 221 (shown in FIG. 2). Liquid fuel and water injection cartridge 390 is installed within each outer gas fuel injection nozzle 211. In some configurations that can burn liquid fuel as an alternative to gas fuel, a liquid fuel mode of operation is provided. This liquid fuel mode delivers sprays of liquid fuel and water into combustion burning zone 213 via liquid fuel and water injection cartridge 390.

Gas fuel nozzle 11 includes a sheet metal screen or inlet flow conditioner 340 that has an array of holes and guide vanes that create a drop in pressure and provide directional guidance for incoming air supplied to combustor chamber inlet or head end 210. Air that passes through inlet flow conditioner 340 is subsequently mixed with gas fuel through a plurality of swirling vanes 337, each of which has integral passages leading to inner premix gas injection holes 341 (inner premixing holes) and outer premix gas injection holes 342 (outer premixing holes). Concentric tube assemblies 343 are arranged in fuel nozzle 211 to form independent fuel passages allowing control of fuel flow split between inner premix gas injection holes 341 and outer premix gas injection holes 342. This inner and outer flow division of gas fuel in the outer fuel nozzle assemblies 211 allows direct control of the concentration distribution of premixed fuel and air as measured radially from a hub 344 of fuel nozzle 211 to a shroud 345 of fuel nozzle 211. Methods used to actively or passively deliver a gas fuel supply that divides the gas fuel flow upstream prior to entering fuel nozzle flange assembly 338 between inner and outer premix passages can be selected as a design choice depending on design requirements of a specific gas turbine application. Methods that allow the concentration distribution of premixed air and fuel to be adjusted to a predetermined value within one or more fuel nozzles as a function of gas turbine engine system 10 operating conditions (such as the methods described herein) can be used to produce minimal NOx emissions along with minimal combustion dynamic pressures.

An additional annular passage 392 is formed by an inner diameter of wall 346 and an outer diameter 391 of liquid fuel and water injection cartridge 390 (or a blank counterpart, not shown, that does not pass fluid but occupies the same or an equivalent space). Annular passage 392 leads to an array of diffusion fuel metering holes 347. Diffusion fuel metering holes 347 and annular passage 392 are supplied with gas fuel and enable the direct injection of gas fuel into combustion burning zone 213 and the production of a diffusion-type combustion flame that is stabilized in a recirculation zone 393 immediately downstream of fuel nozzle aft tip 348. As a result, diffusion combustion can be used as a stabilization feature of the combustion system at ignition and low load conditions. Diffusion combustion as a stable pilot flame can be used with or without simultaneous premixed combustion in various desired combinations, all of which occurs in combustion burning zone 213 of combustor liner 209 downstream of aft plate 230 of combustion liner cap assembly 225.

Figure 4:
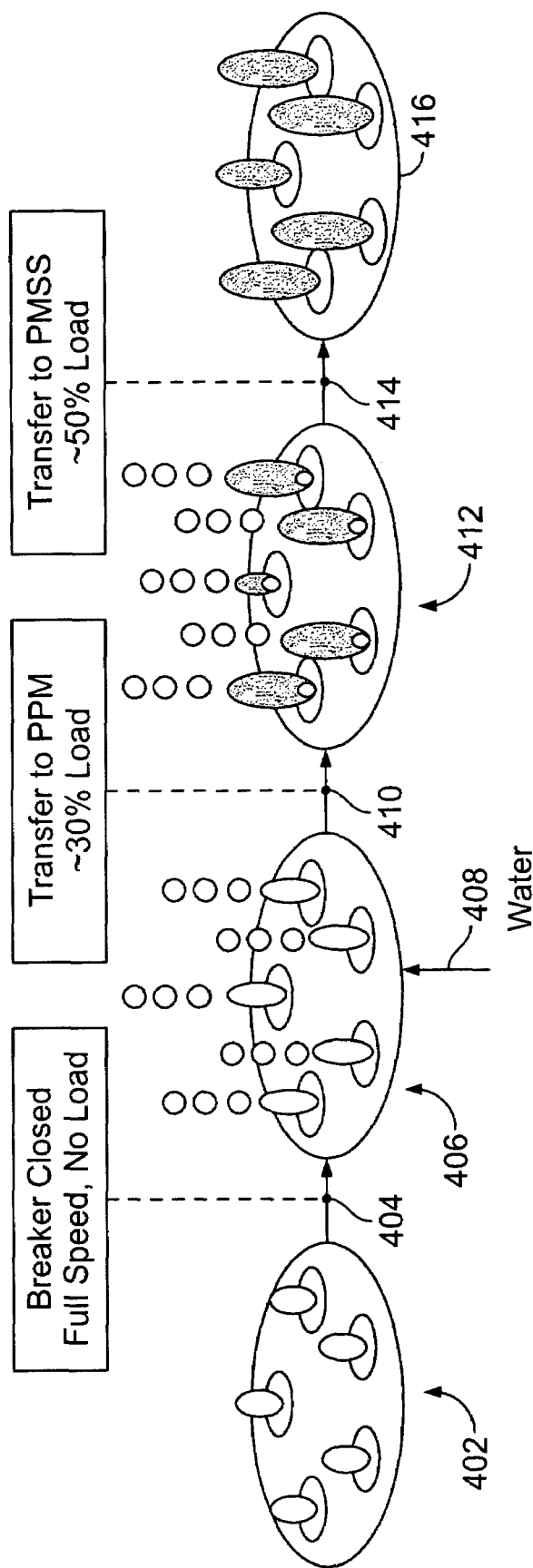
FIG. 4 is a series of schematic illustrations of various stages of an exemplary startup and loading sequence of the dry low $NO_x$ (DLN) combustor illustrated with five outer fuel nozzle assemblies.

FIG. 4 is a series of schematic illustrations of various stages of an exemplary startup and loading sequence of dry low $NO_x$ (DLN) combustor 14 illustrated with five outer fuel nozzle assemblies 211. During a first stage 402 of the startup and loading sequence, combustor 14 is operating using diffusion combustion to warm-up the various gas path components of gas turbine engine system 10 from a cold iron to a warm condition. After a predetermined warm-up period, gas turbine engine system is accelerated to operating speed and the generator output breaker is synchronized and closed 404. During a second stage 406, water injection 408 is initiated to lower the amount of $NO_x$ generated in combustor 14 such that $NO_2$ in exhaust duct 22 is maintained at a level less than that at which a yellow plume is visible, for example, less than fifteen parts per million (ppm). In the exemplary embodiment, during loading, a first fuel split schedule that incorporates water injection is used. Typically, the first fuel split is used only during loading ramp up and during those periods below approximately 50% load where, for operational needs, load may be held relatively constant for a period of time, for example, for testing, maintenance, and/or soaking. In an alternative embodiment, the first fuel schedule is used less than approximately 30% load. The first fuel schedule also determines an amount of water injected into combustor 14, such that generally, as the fuel input to combustor 14 increases during ramp-up, the amount of water injected also increases, for example, but not limited to proportionally.

In the exemplary embodiment, at approximately 30% load, the fuel split schedule modifies 410 combustion in combustor 14 to a piloted premix combustion stage 412 up to approximately 50% load. At approximately 50% load combustion control is modified 414 to provide pre-mix steady state combustion for operation in a fourth stage 416. Water injection is ramped down to substantially zero water injection and a second fuel split schedule may be automatically selected for operation up to 100% load.

Figure 5:
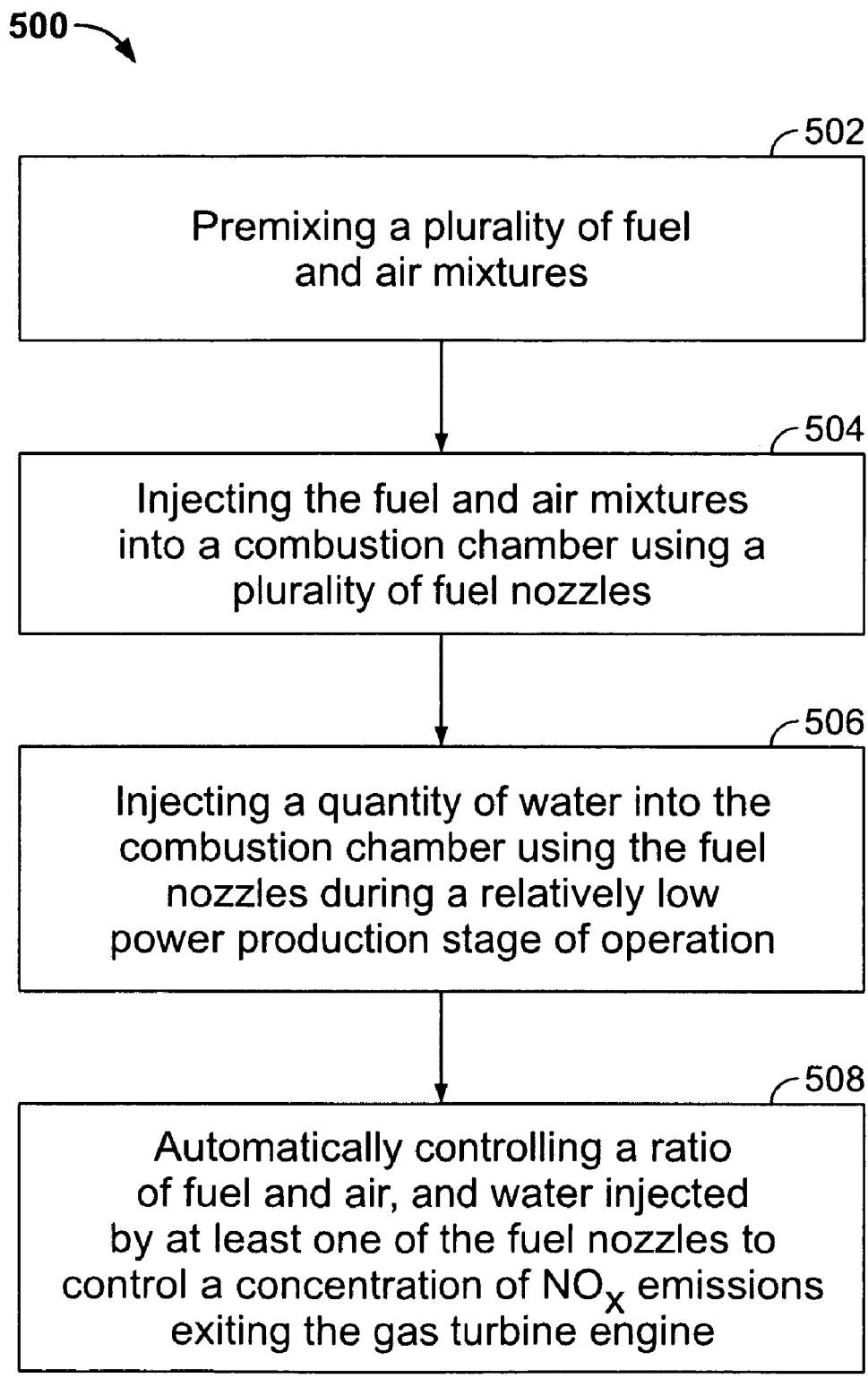
FIG. 5 is a flow chart of an exemplary method of reducing visible exhaust stack emissions that may be used with gas turbine engine system shown in FIG. 1.

FIG. 5 is a flow chart of an exemplary method 500 of reducing visible exhaust stack emissions that may be used with gas turbine engine system 10 (shown in FIG. 1).

Low-emission method 500 for producing power using gas turbine engine 10 includes premixing 502 a plurality of fuel and air mixtures, injecting 504 the fuel and air mixtures into a combustion chamber using a plurality of fuel nozzles. Method 500 includes injecting 506 a quantity of water into the combustion chamber using the fuel nozzles during a relatively low power production stage of operation. In the exemplary embodiment, a variable frequency drive (VFD) pump coupled with flow and system pressure feedback for precise water to fuel/air ratio control is used. The VFD provides turndown of a supply of water to provide the low water flow used for the relatively low gas turbine load levels when water injection is used. Method 500 also includes automatically controlling a ratio of fuel and air, and water injected by at least one of the fuel nozzles to control a concentration of $NO_x$ emissions exiting the gas turbine engine. Combustion water injection is used with the DLN combustion system to control the total amount of $NO_x$ generated to a level where in the 0-50% load range even with 100% conversion of NO to $NO_2$, the $NO_2$ level exiting the exhaust stack will not be visible while maintaining a stable flame with robust operability and durability in the combustion system. Water injection is used to reduce combustion dynamics due to flame instabilities. Due to the lower dynamics, more even fuel splits (uniform fuel distribution within the combustion chamber) can be obtained. One cause of high emissions during low load operations of a gas turbine is that there are local hot and cold spots inside the combustion chamber due to the uneven fuel distribution required to control dynamics. More even fuel splits reduce these hot and cold zones and the emissions generated by having equal amount of fuel come out of each fuel nozzle. A secondary benefit of more even fuel splits is more even heat loading on the combustion hardware, which increases durability. Therefore, it is the utilization of water injection that allows the design requirements of low $NO_x$ and robust durability to be met at the same time. The water injection facilitates reducing NO, $NO_2$, $NO_x$, and combustion dynamics in any of diffusion, partially premixed, or fully premixed combustion system operating modes.

Method 500 includes operating a controller to provide two gas fuel split schedules, one for operation without water injection and one for operation with water injection. The first schedule allows the utilization of even gas fuel splits and controls the water injection so that there is minimum plume intensity without negatively affecting the combustion system hardware life. The second schedule is used as a backup should there be a trip of the water injection system. The controller is programmed to control the visibility of the exhaust plume by reducing stack exit $NO_2$ concentration to less than 15 ppm, which through testing is determined to be a visibility threshold. Additionally, although there are many factors that affect the visibility of a plume including stack diameter and background luminosity it is further determined that 30 ppm $NO_2$ concentration is a visible threshold between a light plume and a heavy plume.

The above-described methods and apparatus provide a cost-effective and reliable means for automatically and continuously modulating water injection into a DLN combustor during relatively low load periods, such as warm-up for a combined cycle power plant. The water injection is primarily used during diffusion, partially premixed, or fully premixed combustion system operating modes at power load levels where mitigation of visible emissions is desired. More specifically, the methods facilitate operation by reducing yellow plume during low power levels of low $NO_x$ emissions combustion systems. As a result, the methods and systems described herein facilitate gas turbine engine operation in a cost-effective and reliable manner.

An exemplary methods and apparatus for reducing visible emissions from a gas turbine engine and controlling the fuel split schedule for fuel/air and water supplied to the gas turbine engine combustors are described above in detail. The apparatus illustrated is not limited to the specific embodiments described herein, but rather, components of each may be utilized independently and separately from other components described herein. Each system component can also be used in combination with other system components.

A technical effect of the method and apparatus is to provide a system that automatically and continuously modulates water injection to facilitate operation without a substantially visible exhaust plume.

While the invention has been described in terms of various specific embodiments, those skilled in the art will recognize that the invention can be practiced with modification within the spirit and scope of the claims.

What is claimed is:

1. A dry low $NO_x$ gas turbine engine system comprising:
   a gas turbine engine comprising at least one dry low $NO_x$ combustor including a plurality of injection points, at least some of the injection points configured to inject a fuel into said combustor at a plurality of different locations;
   a liquid water source coupled to said combustor and operable to inject liquid water into others of said plurality of injection points; and
   a control system comprising:
      a sensor configured to measure a concentration of $NO_x$ present in turbine exhaust gas;
      a processor programmed to:
         receive a signal indicative of the turbine exhaust gas $NO_x$ concentration; and
         automatically transmit a signal for controlling the water injection using the received exhaust gas $NO_x$ concentration signal.

2. A gas turbine engine system in accordance with claim 1 wherein said processor is further programmed to transmit a signal for controlling a first fuel split schedule to said plurality of injection points during the injection of water and to transmit a signal for controlling a second fuel split schedule to said plurality of injection points during operation without the injection of water.

3. A gas turbine engine system in accordance with claim 1 wherein said processor is further programmed to:
   transmit a signal for controlling water injection to facilitate reducing combustion dynamics due to flame instabilities, wherein the reduced combustion dynamics permits use of a plurality of fuel split schedules; and
   transmit a signal for controlling fuel injection using a plurality of fuel split schedules configured to facilitate reducing hot and cold firing zones in said combustor.

4. A gas turbine engine system in accordance with claim 1 wherein said water source is controlled by a pump coupled to a variable frequency drive and wherein said processor is further programmed to transmit a command to the variable frequency drive that controls the speed of the water injection pump.

5. A gas turbine engine system in accordance with claim 1 wherein said control system is configured to receive a signal indicative of a $NO_2$ concentration in at least one of the turbine exhaust and the turbine exhaust stack.

6. A gas turbine engine system in accordance wit claim 1 wherein said processor is further programmed to determine a quantity of water injection using the received signal.

7. A gas turbine engine system in accordance with claim 1 wherein said processor is further programmed to automatically transmit a signal for controlling the water injection to maintain a $NO_2$ concentration in the turbine exhaust stack less than 30 ppm.

8. A gas turbine engine system in accordance with claim 1 wherein said processor is further programmed to automatically transmit a signal for controlling the water injection to maintain a $NO_2$ concentration in the turbine exhaust stack less than 15 ppm.

9. A combined cycle power plant system comprising:
   a dry low $NO_x$ gas turbine engine system comprising at least one dry low $NO_x$ combustor including a plurality of injection points, at least some of the injection points configured to inject a fuel into said combustor at a plurality of different locations;
   a liquid water source coupled to said combustor and operable to inject liquid water into others of said plurality of injection points; and
   a control system comprising:
      a sensor configured to measure a concentration of $NO_x$ present in an exhaust gas; and
      a processor programmed to:
         receive a signal indicative of the exhaust gas $NO_x$ concentration; and
         automatically $NO_x$ transmit a signal for controlling the water injection using the received exhaust gas concentration signal.

10. A combined cycle power plant system in accordance with claim 9 wherein said water source is controlled by a pump coupled to a variable frequency drive.

11. A combined cycle power plant system in accordance with claim 10 wherein said processor is further programmed to transmit a command to the variable frequency drive that controls the speed of the water injection pump.

12. A combined cycle power plant system in accordance wit claim 9 wherein said control system is configured to receive a signal indicative of a $NO_2$ concentration in to turbine exhaust stack.

13. A combined cycle power plant system in accordance wit claim 9 wherein said processor is further programmed to determine a quantity of water injection using to received signal.

14. A combined cycle power plant system in accordance with claim 9 wherein said processor is further programmed to automatically transmit a signal for controlling the water injection to maintain a $NO_2$ concentration in the turbine exhaust stack less tan 15 ppm.

* * * * *